(12) United States Patent　　(10) Patent No.: US 8,986,012 B1
McGee　　(45) Date of Patent: Mar. 24, 2015

(54) THREE-DIMENSIONAL 3D VISUALIZATION KIT

(75) Inventor: Daniel L. McGee, Mayaguez, PR (US)

(73) Assignee: University of Puerto Rico, San Juan, PR (US)

( * ) Notice: Subject to any disclaimer, the term of this patent is extended or adjusted under 35 U.S.C. 154(b) by 454 days.

(21) Appl. No.: 12/803,744

(22) Filed: Jul. 1, 2010

Related U.S. Application Data

(60) Provisional application No. 61/222,390, filed on Jul. 1, 2009.

(51) Int. Cl.
*A63H 33/04* (2006.01)
*G09B 23/02* (2006.01)

(52) U.S. Cl.
USPC .......................................... 434/211; 446/118

(58) Field of Classification Search
USPC ................. 434/407, 188, 190, 211, 278, 300; 446/85, 117, 118, 120, 121, 124, 92, 446/129, 137
See application file for complete search history.

(56) References Cited

U.S. PATENT DOCUMENTS

| | | | | |
|---|---|---|---|---|
| 2,810,233 A | * | 10/1957 | Jakobsen | 446/126 |
| 3,028,686 A | * | 4/1962 | Frisch | 434/190 |
| 3,083,475 A | * | 4/1963 | Lepoudre | 434/211 |
| 3,191,318 A | * | 6/1965 | Hoffmann | 434/211 |
| 3,339,297 A | * | 9/1967 | Stinn et al. | 434/190 |
| 3,375,604 A | * | 4/1968 | Alonso | 446/92 |
| 3,469,339 A | * | 9/1969 | Thomas | 446/122 |
| 3,564,735 A | * | 2/1971 | Fisher | 434/403 |
| 3,594,940 A | * | 7/1971 | Yonezawa | 446/118 |
| 3,902,270 A | * | 9/1975 | Molenaar | 446/122 |
| 3,975,858 A | * | 8/1976 | Much | 446/107 |
| 3,987,579 A | * | 10/1976 | Palenik, III | 446/118 |
| 5,291,702 A | * | 3/1994 | Hooper | 52/80.1 |
| 5,310,376 A | * | 5/1994 | Mayuzumi et al. | 446/107 |
| 5,823,843 A | * | 10/1998 | Pohlman | 446/120 |
| 2005/0118926 A1 | * | 6/2005 | Roger | 446/137 |
| 2005/0227574 A1 | * | 10/2005 | Balanchi | 446/92 |
| 2006/0084300 A1 | * | 4/2006 | Kowalski et al. | 439/100 |
| 2007/0287354 A1 | * | 12/2007 | McCloskey | 446/108 |

\* cited by examiner

*Primary Examiner* — Gene Kim
*Assistant Examiner* — Alyssa Hylinski
(74) *Attorney, Agent, or Firm* — Hoglund & Pamias, PSC; Roberto J. Rios

(57) ABSTRACT

The 3D visualization kit helps visualize concepts relating to points, surfaces, planes, curves, contours, and vectors in three dimensions. The kit is an inexpensive solution provided along with accompanying materials for its use that will allow students to effectively visualize concepts in three dimensions and aid in understanding important calculations in multivariable calculus eliminating the abstraction normally associated with concepts in three dimensions.

15 Claims, 10 Drawing Sheets

(a)

(b)

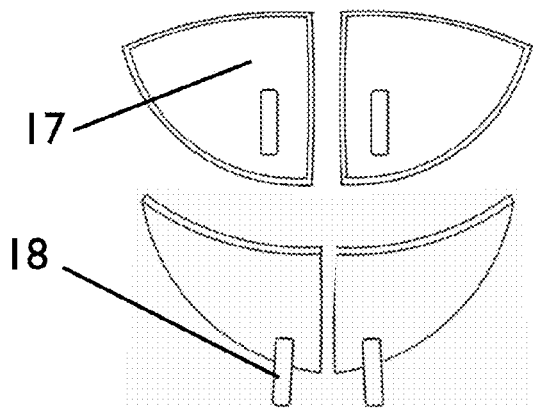
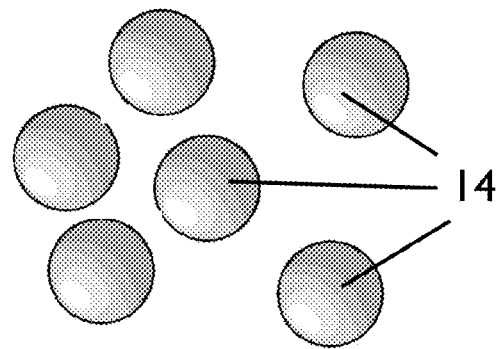
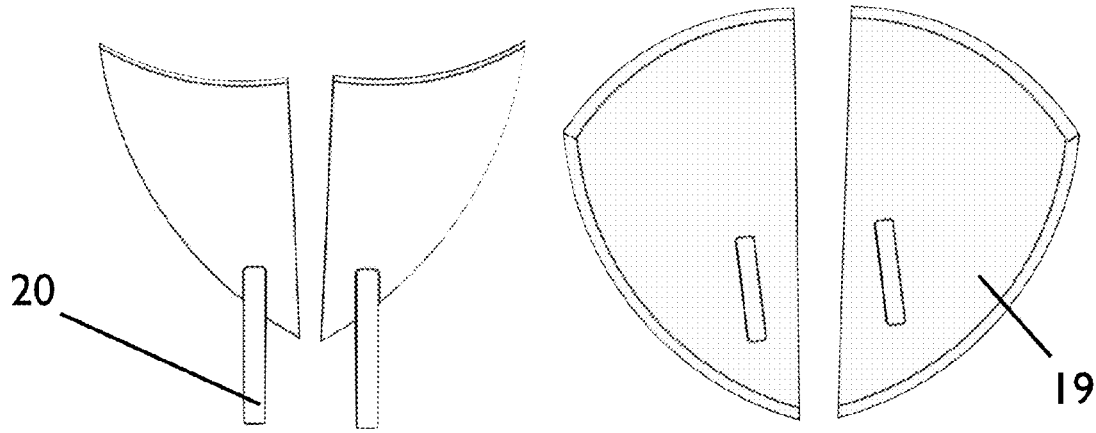
FIG. 9
FIG. 8
FIG. 10

(a)

(b)

(a)

(b)

(a)

(b)

US 8,986,012 B1

THREE-DIMENSIONAL 3D VISUALIZATION KIT

FEDERAL GRANTS

This research was supported, in part by the National Science Foundation through their DUE-995256 and DUE-0442365 grants. The Government has certain rights in this invention.

FIELD OF THE INVENTION

This invention relates generally to a visual aid, which may be used as a teaching aid and more particularly, to a visualization kit that has a plurality of elements that are interconnected to represent mathematical three-dimensional figures.

BACKGROUND OF THE INVENTION

Currently, there exists a lack of geometric visualization in the student's comprehension of three-dimensional concepts in multivariable calculus. Unfortunately, this in turn makes it difficult for the student to understand the basic calculations involved in math and engineering classes. For example, most students are confused about the signs of the first and second derivatives in various directions, when confronted with a picture of a surface on an exam. They are unable to determine the slope of the line between two points in 3D. Nor could they easily determine which integral is larger when given two surfaces, one clearly above the other.

Computer software has provided enormous aids to students and professors wishing to visualize concepts in three dimensions. However, there are many concepts where the two dimensional nature of a computer screen can limit the effectiveness of these packages; particularly if students have a weak geometric background. For example, directional derivatives require the tangent line to a surface in a direction associated with the xy plane. In three dimensions, a surface can be placed over the xy plane, the direction on the xy plane can be indicated and the concept can be visualized quite easily. However, visualizing a precise direction and its associated tangent line on a 2D computer screen is often difficult for students. Correspondingly, a more effective pedagogical approach is to use physical 3D manipulatives. These allow visualization and motivation of, concepts in a real three dimensional space. Particularly when students are first being introduced to multivariable functions, this often proves more effective than a projection of three dimensions onto a two dimensional computer screen.

Thus, what is needed, is a simple, hands-on 3D tool for use as aid in teaching these concepts.

SUMMARY OF THE INVENTION

The present invention advantageously helps students of science and engineering visualize concepts relating to points, surfaces, planes, curves, contours, and vectors in three dimensions.

According to an aspect of the invention, a 3D kit is provided to aid students understand important calculations in multivariable calculus eliminating the abstraction normally associated with concepts in three dimensions.

According to another aspect of the invention, an inexpensive kit is provided along with the accompanying materials for its use that will allow students to effectively visualize concepts in three dimensions.

BRIEF DESCRIPTION OF THE DRAWINGS

Further features and advantages of the invention will become apparent from the following detailed description taken in conjunction with the accompanying figures showing illustrative embodiments of the invention, in which:

FIG. 8 shows a plurality of magnetic marbles representing points according to the present invention.

FIG. 9 shows a hemisphere element according to the present invention.

FIG. 10 shows a paraboloid element according to the present invention.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

The basic interconnecting components of the 3D visualization kit are shown in FIGS. 1-10. These components are used interchangeably in order to form and represent points, surfaces, planes, curves, contours, and vectors in three dimensions as will be shown and explain later.

Figure 1:
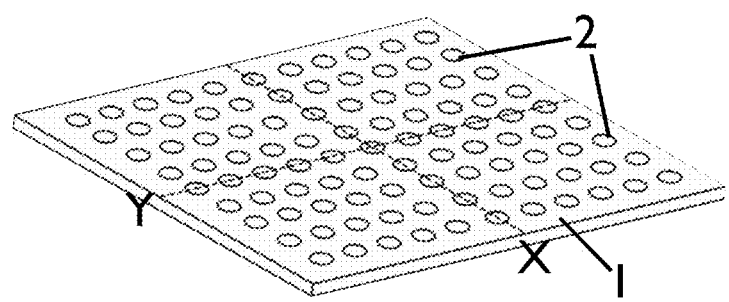
FIG. 1 shows a pegboard according to the present invention.
Figure 3:
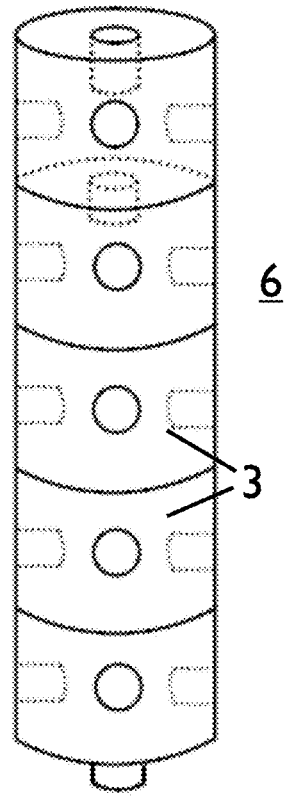
FIG. 3 shows a plurality of stacked axial, pegs defining axis Z according to the present invention.
Figure 2:
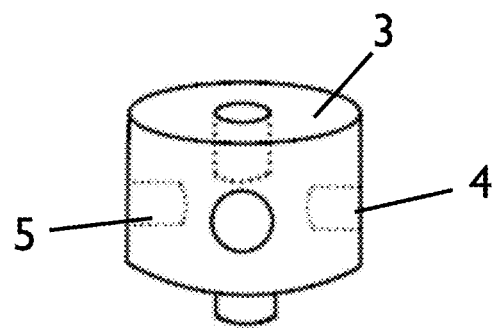
FIG. 2 shows an axial peg according to the present invention.

FIG. 1 shows the basic component of the system in the form of a flat surface pegboard 1 having on its top surface a plurality of holes 2. These holes are evenly and symmetrically spaced in a matrix-like arrangement. The surface of said pegboard 1 represents a two-dimensional arrangement (i.e., X-Y). FIG. 2 shows an axial peg 3 designed to have a reciprocal dual-engaging arrangement. As can be seen, an inserting protrusion 5 is positioned on a side of said axial peg 3 and longitudinally opposing a receiving hole 4 located on an opposing surface of said axial peg 3. A similar arrangement is provided between the upper and lower side of said axial peg 3. Horizontal lines can be formed using axial peg 3 by using the center holes as shown in FIG. 2. As will be illustrated later, the axial peg 3 is used to represent a third dimension in relation to the two-dimensional arrangement provided by said pegboard 1. A plurality of axial pegs 3 can be stacked on top of each other to represent an extending dimensional axis (i.e., Z axis) by placing the inserting protrusion 5 of one axial peg 3 into the receiving hole 4 of another axial peg 3 as shown in FIG. 3. A dimensional unit is assigned to the height of each axial peg 3 to represent points and distances in a three-dimensional environment (i.e., 3 units in the direction of the Z axis=3 stacked axial pegs).

Figure 4:
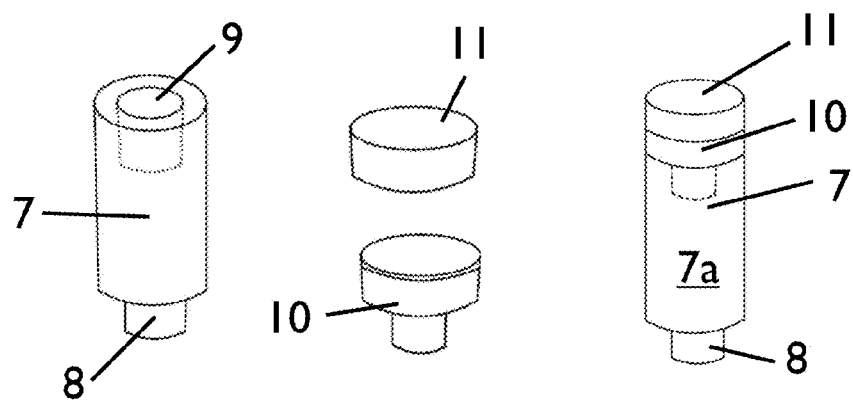
FIG. 4 shows a peg inserting/magnetic arrangement according to the present invention.
Figure 5:
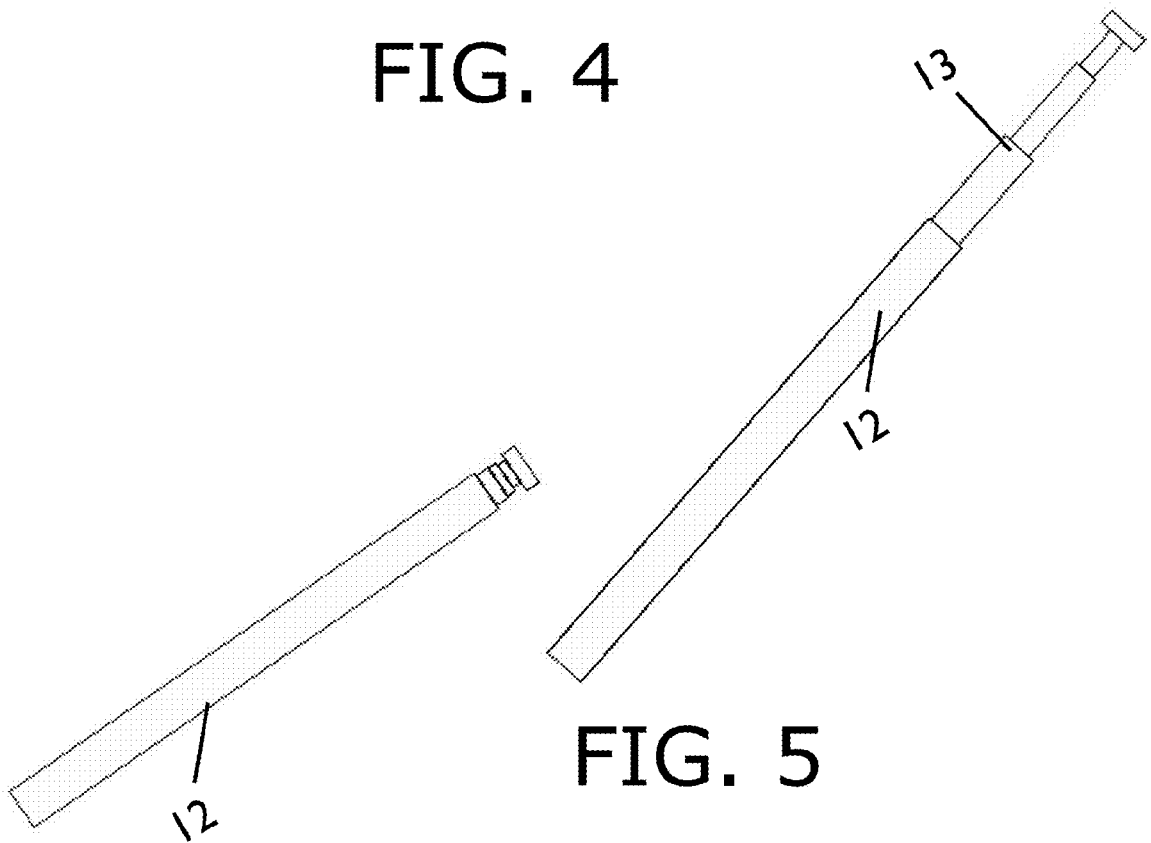
FIG. 5 shows an antenna representing a vector according to the present invention.
Figure 7:
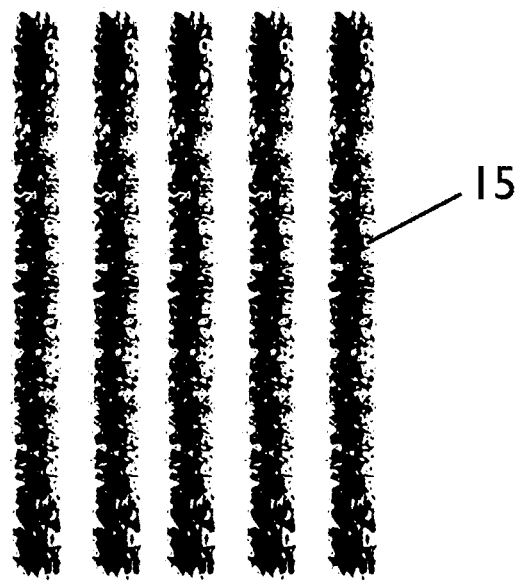
FIG. 7 shows a plurality of flexible metallic elements representing curves according to the present invention.
Figure 6:
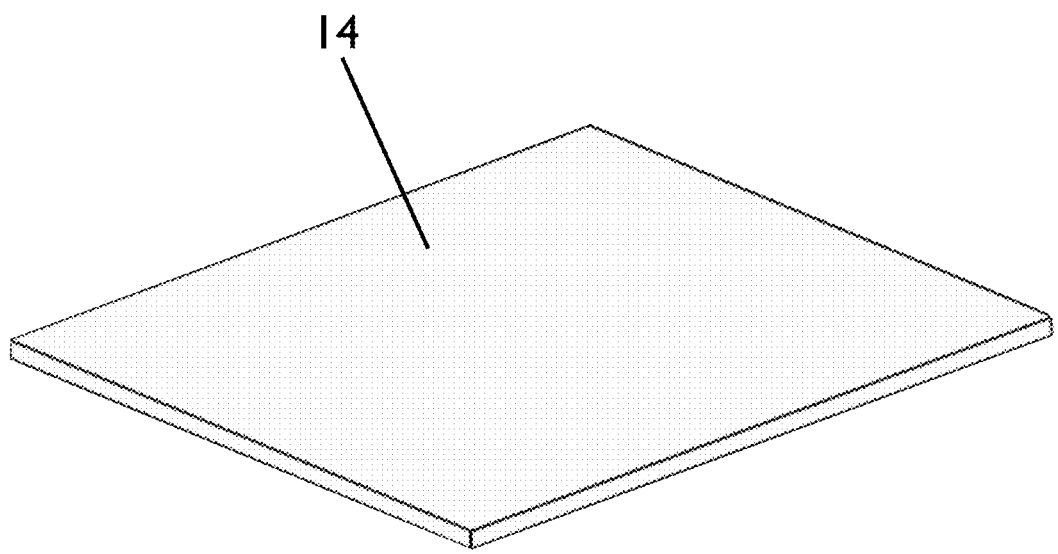
FIG. 6 shows a plane representation according to the present invention.

Pegs 7 are provided to interconnect the pegboard 1 and the rest of the components of said 3D visualization kit when creating a three-dimensional element. A hole 8 is provided on one end of said peg 7 and an inserting protrusion 9 is provided on the other end of said peg 7 as shown in FIG. 4. As will be explained in detail later, this arrangement allows stacking a plurality of pegs 7 similar to the stacking configuration of said axial peg 3. A metallic peg 10 has a protrusion to be inserted inside any hole of the 3D kit so that when a magnet 11 is placed on its other end it provides the means for holding up points, vectors, curves and planes in space. 7a denotes a peg 7 having interconnected metallic peg 10 and magnet 11. In the present invention, vectors are represented by antennas 12 having a telescopic component 13 on one end thereof, allowing to selectively extend the length of said antenna 12. Metallic sheets 14 are provided to represent planes as shown in FIG. 6. In a preferred embodiment, pipe cleaners 15 as shown in FIG. 7, are provided to represent curves as will be explained later in detail. Alternatively, any metallic rod-like flexible element can be used. Three-dimensional points are represented in the 3D visualizing kit by metallic balls or marbles as shown in FIG. 8.

Hemispheres and paraboloids are represented by components 17 and 19 as shown in FIGS. 9 and 10. Insertion protrusions 18 and 20 are inserted in the holes of the 3D kit to secure said Hemispheres and paraboloids when forming three-dimensional figures.

In operation, the above-explained components are selectively used and positioned to form three-dimensional representations as will be explained in conjunction with FIGS. 11-16.

Figure 11:
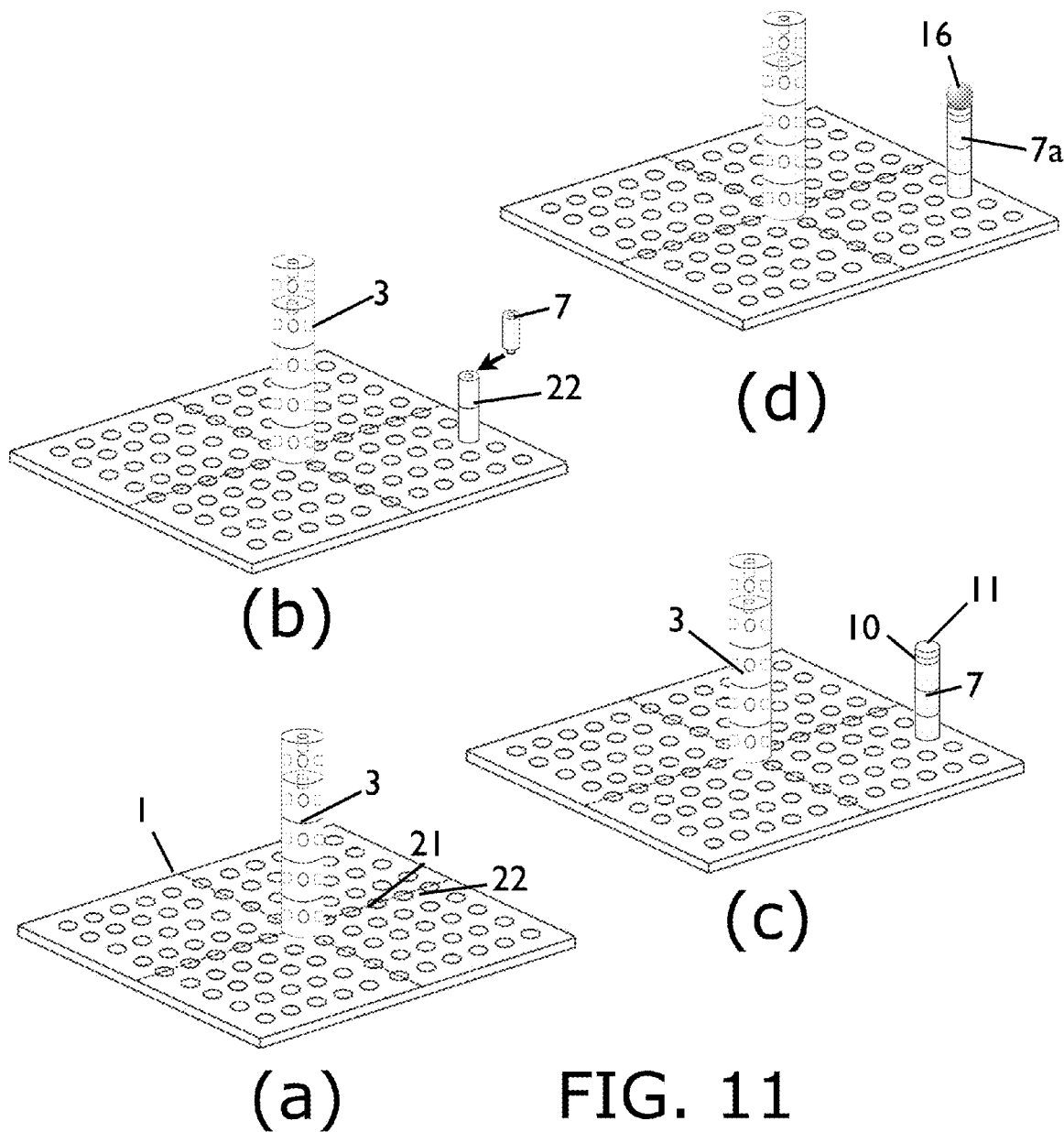
FIG. 11(a)-(d) illustrates the steps for forming a point according to the present invention.

FIG. 11 illustrates the necessary steps to form a point defined by (X, Y, Z) using the 3D visualization kit of the present invention. First, a plurality of stacked axial pegs 3 are provided and inserted into said pegboard 1 to represent axis Z as shown in step (a). Then, the exact position X and Y on the pegboard 1 is located. If desired, the linear movement along these axes can be mark on said pegboard as shown in step (a), to help the students remember its position and to aid with any required calculation. After the X,Y position of the point has been located, a peg 7 is inserted into the hole representing the said X,Y position as shown in step (b). Additional pegs 7 might be stacked to indicate linear distance or height in the direction of axis Z. As illustrated in steps (c) and (d), the metallic peg 10 is positioned on top of the last peg 7 to receive the magnetic marble 16.

Figure 12:
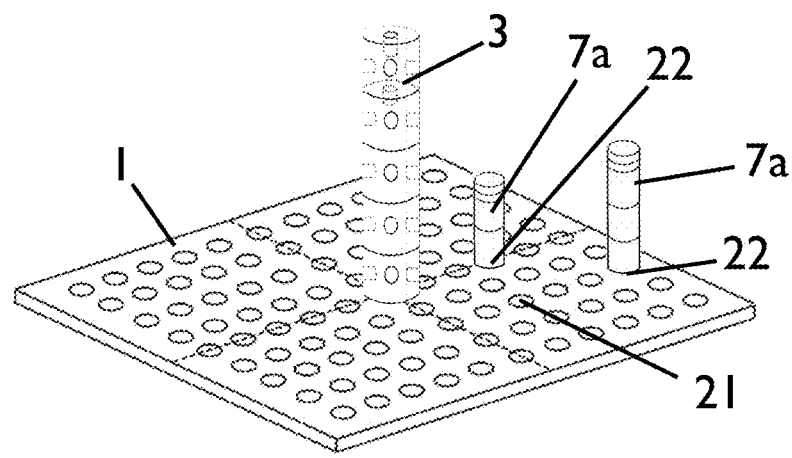
FIG. 12(a)-(b) illustrates the steps for forming a curve according to the present invention.
Figure 12:
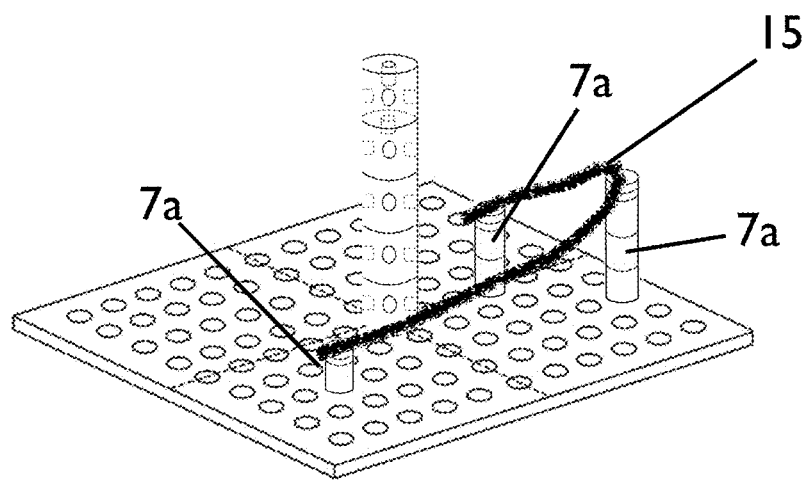

FIG. 12 illustrates the necessary steps to form a curve that passes through points $(X_1, Y_1, Z_1)$, $(X_2, Y_2, Z_2)$ and $(X_3, Y_3, Z_3)$ using the 3D visualization kit of the present invention. On step (a), axis Z and points $(X_1, Y_1, Z_1)$, $(X_2, Y_2, Z_2)$ and $(X_3, Y_3, Z_3)$ are defined and installed as previously explained above. Each peg 7a must have installed on its top the metallic peg 10 with magnet 11. Then, the flexible metallic component 15 is molded to the desired form of the curve and magnetically placed in contact with pegs 7a as shown in step (b).

Figure 13:
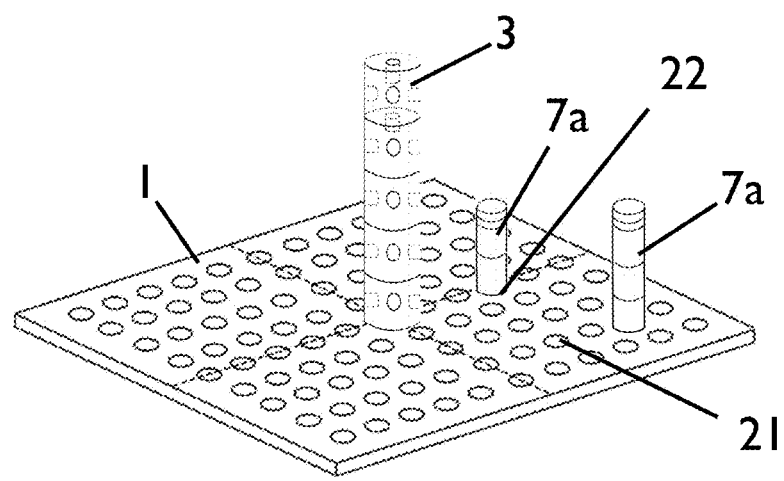
FIG. 13(a)-(b) illustrates the steps for forming a vector according to the present invention.
Figure 13:
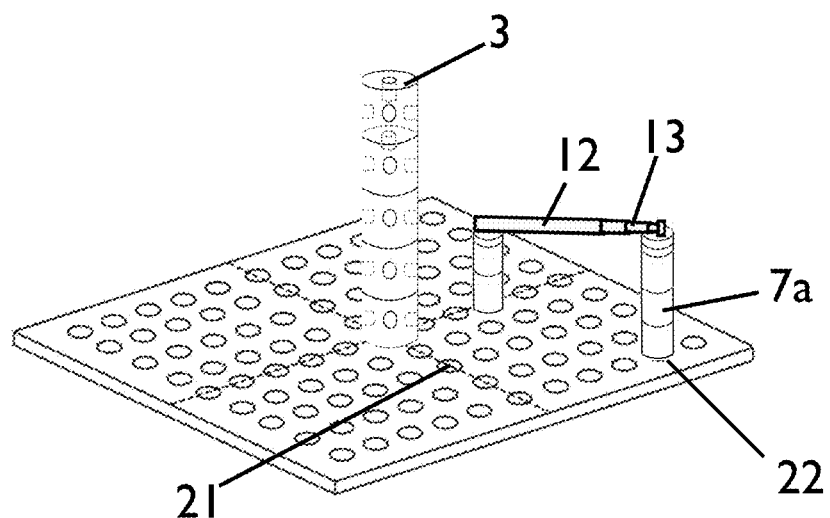

FIG. 13 illustrates the necessary steps to form a vector that goes from point $(X_1, Y_1, Z_1)$ to point $(X_2, Y_2, Z_2)$ using the 3D visualization kit of the present invention. On step (a), axis Z, points $(X_1, Y_1, Z_1)$ and $(X_2, Y_2, Z_2)$ are defined and installed as previously explained above. Each peg 7a must have installed on its top the metallic peg 10 with magnet 11. Then, one end of the antenna 12 is magnetically placed on top of the peg 7a defining point $(X_1, Y_1, Z_1)$ and portion 13 is extended so that the other end of the antenna 12 magnetically rests on top of the peg 7a defining point $(X_2, Y_2, Z_2)$ as shown in step (b).

Figure 14:
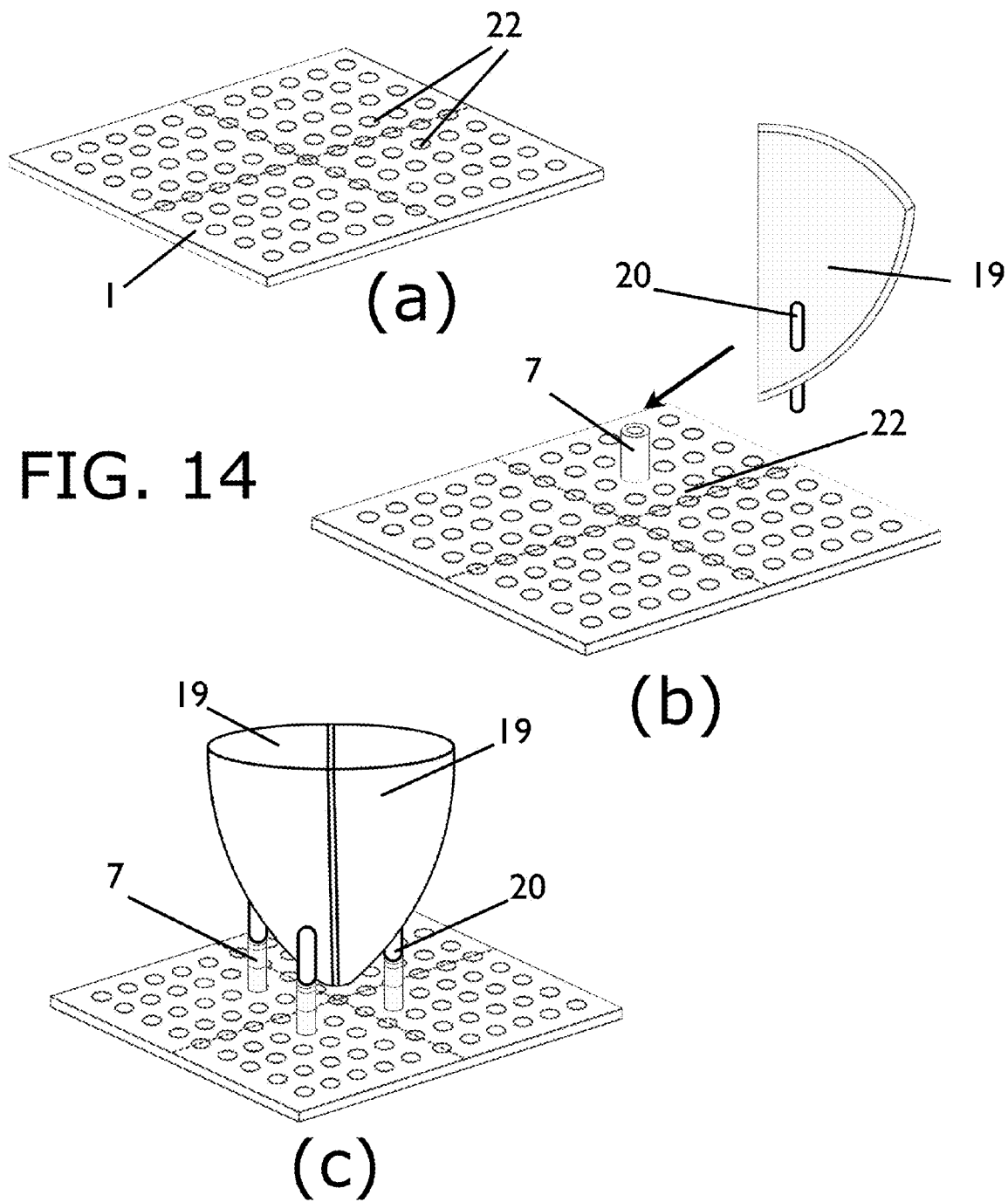
FIG. 14(a)-(c) illustrates the steps for forming a paraboloid according to the present invention.
Figure 15:
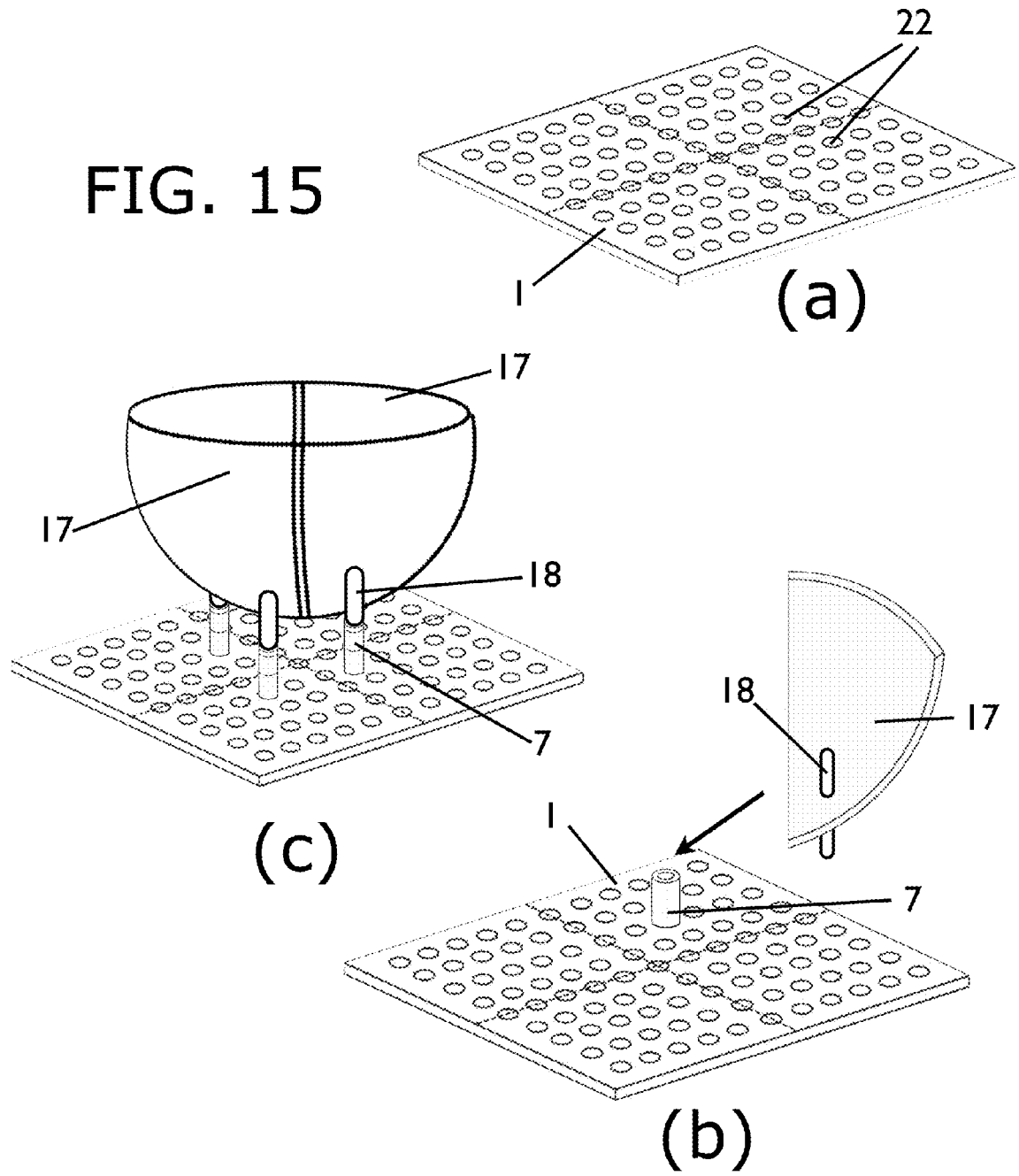
FIG. 15(a)-(c) illustrates the steps for forming a hemisphere according to the present invention.

FIGS. 14 and 15 illustrate the necessary steps to form a hemisphere and paraboloid with vertex in the origin $(X_1, Y_1, Z_1)$ using the 3D visualization kit of the present invention. On step (a), points $(X_1, Y_1, Z_1)$ to $(X_4, Y_4, Z_4)$ are defined and marked on said pegboard 1. Then, a peg 7 is inserted on each identified point to receive insertion protrusions 18 and 20 so that four hemisphere and paraboloid components 17 and 19 are positioned together to form the desired configuration as shown in steps (b) and (c). It should be noted that the procedures to form a hemisphere and paraboloid using the 3D visualization kit of the present invention is similar.

Figure 16:
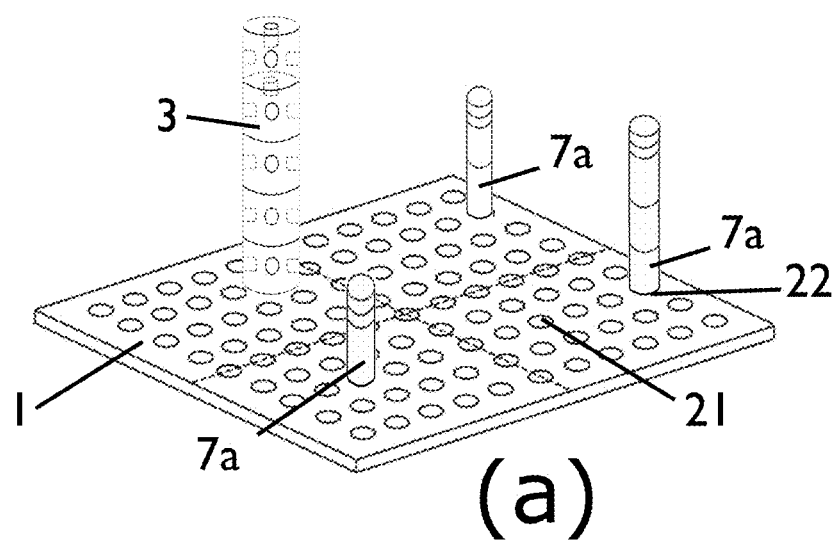
FIG. 16(a)-(b) illustrates the steps for forming a plane according to the present invention.
Figure 16:
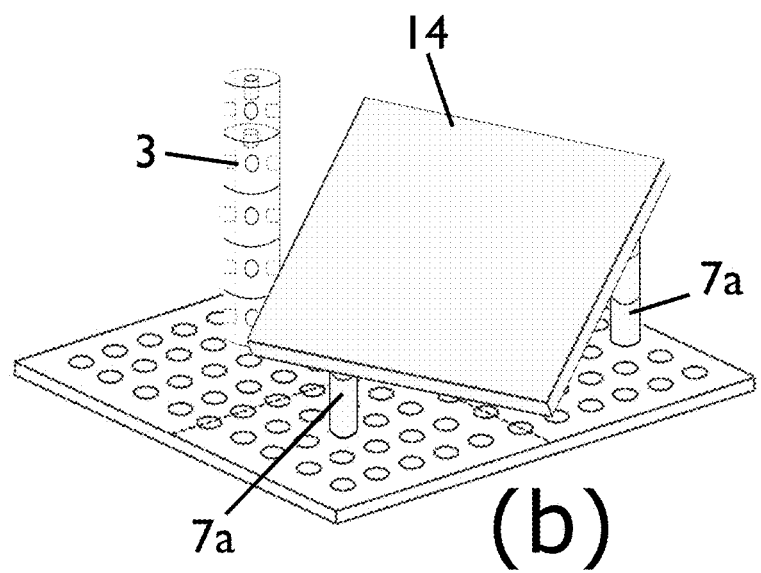

FIG. 16 illustrates the necessary steps to form a plane that passes through points $(X_1, Y_1, Z_1)$, $(X_2, Y_2, Z_2)$ and $(X_3, Y_3, Z_3)$ using the 3D visualization kit of the present invention. On step (a), axis Z and points $(X_1, Y_1, Z_1)$, $(X_2, Y_2, Z_2)$ and $(X_3, Y_3, Z_3)$ are defined and installed as previously explained above. Each peg 7a must have installed on its top the metallic peg 10 with magnet 11. Then, the metallic sheet plane 14 is magnetically placed over pegs 7a as shown in step (b).

It is important to note that a water-based marker can be used to write on all materials of the 3D kit. This allows supplementing demonstrations in three dimensions with appropriate symbols, calculations, and numbers.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A 3D visualization kit comprising:
   a base pegboard having a plurality of holes;
   at least one axial peg having a hole in its top surface, a protrusion on its bottom surface and a plurality of holes distributed along its lateral periphery, wherein the height of said at least one axial peg is assigned a dimensional unit of a three-dimensional environment;
   at least one peg having a top hole and a bottom protrusion;
   at least one metallic elongated element having one telescopic end;
   a metallic planar element;
   at least one metallic bendable elongated element;
   at least one metallic spherical element;
   at least one metallic peg having a flat top surface and a bottom protrusion configured to be inserted inside the top hole of said at least one peg;
   at least one magnet;
   at least one hemisphere element having a single inner protrusion positioned at an inner surface of said at least one hemisphere element and a single outer protrusion coaxially positioned with said single inner protrusion at an outer surface of said at least one hemisphere element, wherein both inner and outer protrusions are capable of being inserted into the top hole of said at least one peg; and
   at least one paraboloid element having a single inner protrusion positioned at an inner surface of said at least one paraboloid element and a single outer protrusion coaxially positioned with said single inner protrusion at an outer surface of said at least one paraboloid element, wherein both inner and outer protrusions are capable of being inserted into the top hole of said at least one peg.

2. The 3D visualization kit of claim 1, wherein said at least one hemisphere element comprises ¼ of a hemisphere shape.

3. The 3D visualization kit of claim 1, wherein said at least one paraboloid element comprises ¼ of a paraboloid shape.

4. The 3D visualization kit of claim 1, wherein two dimensional axes are defined by the top surface of said base pegboard and a third longitudinal axis is defined by stacking a plurality of said axial pegs perpendicular to the top surface of the base pegboard.

5. The 3D visualization kit of claim 1, wherein additional two-dimensional axes are formed by engaging at least one two-dimensional plane to said plurality of holes distributed along the lateral periphery of one axial peg.

6. The 3D visualization kit of claim 1, wherein a three-dimensional point is formed by defining the location of said point in relation to said base pegboard; and placing at least one metallic spherical element at said point on top of said magnet.

7. The 3D visualization kit of claim 6, wherein at least one peg is inserted into a hole of said base pegboard, a bottom protrusion of said at least one metallic peg is inserted inside the top hole of said at least one peg, said at least one magnet is placed over said flat top surface and said at least one metallic spherical element is placed over said magnet.

8. The 3D visualization kit of claim 1, wherein a three-dimensional curve is formed by defining in relation to said base pegboard a plurality of points intersecting said curve; and placing said at least one metallic bendable elongated element over a plurality of magnets positioned on said plurality of intersecting points.

9. The 3D visualization kit of claim 8, wherein at least one peg is inserted into a hole of said base pegboard, a bottom protrusion of said at least one metallic peg is inserted inside the top hole of said at least one peg, said at least one magnet is placed over said flat top surface and said at least one metallic bendable elongated element is placed over at least one magnet.

10. The 3D visualization kit of claim 1, wherein a three-dimensional vector is formed by defining in relation to said base pegboard a first and second point intersecting said vector; placing one end of said at least one metallic elongated element over said first point over a magnet; and extending said telescopic end so that it is placed over said second point over another magnet.

11. The 3D visualization kit of claim 10, wherein at least one peg is inserted into a hole of said base pegboard, a bottom protrusion of said at least one metallic peg is inserted inside the top hole of said at least one peg, said at least one magnet is placed over said flat top surface and at least one end of said metallic elongated element is placed over said at least one magnet.

12. The 3D visualization kit of claim 2, wherein a three-dimensional hemisphere is formed by defining in relation to said base pegboard the point of said hemisphere center; inserting a plurality of pegs into the holes of said base pegboard; and placing four hemisphere elements together side-by-side so that either the single inner or the single outer protrusions of the hemisphere elements are inserted into the top hole of the plurality of pegs, forming a hemisphere.

13. The 3D visualization kit of claim 3, wherein a three-dimensional paraboloid is formed by defining in relation to said base pegboard the point of said paraboloid vertex; inserting a plurality of pegs into the holes of said base pegboard; and placing four paraboloid elements together side-by-side so that either the single inner or the single outer protrusions of the paraboloid elements are inserted into the top hole of the plurality of pegs, forming a paraboloid.

14. The 3D visualization kit of claim 1, wherein a three-dimensional plane is formed by defining in relation to said base pegboard a plurality of points intersecting said plane; and placing said metallic planar element over a plurality of magnets positioned on said plurality of intersecting points.

15. The 3D visualization kit of claim 14, wherein at least one peg is inserted into a hole of said base pegboard, a bottom protrusion of said at least one metallic peg is inserted inside the top hole of said at least one peg, said at least one magnet is placed over said flat top surface and at least a portion of said metallic planar element is placed over said at least one magnet.

\* \* \* \* \*